United States Patent [19]

Peng

[11] Patent Number: 5,634,563

[45] Date of Patent: Jun. 3, 1997

[54] CD STORAGE RACK

[76] Inventor: Jung-Ching Peng, P.O. Box 82-144, Taipei, Taiwan

[21] Appl. No.: 563,306

[22] Filed: Nov. 28, 1995

[51] Int. Cl.$^6$ ............................................. A47G 29/00
[52] U.S. Cl. ......................... 211/40; D6/629; 206/308.1
[58] Field of Search ........................ 211/40, 41; 206/307, 206/308.1, 308.3, 309, 387.12, 387.13, 387.15; 312/9.1, 9.3, 9.9, 9.11, 9.19, 9.26, 9.27, 9.47; D6/407, 627, 628, 629, 630

[56] References Cited

U.S. PATENT DOCUMENTS

| | | | |
|---|---|---|---|
| 4,932,522 | 6/1990 | Milovich | 206/308.1 |
| 5,097,946 | 3/1992 | Emrich | 206/308.1 X |
| 5,370,244 | 12/1994 | Peng | 211/40 |
| 5,464,091 | 11/1995 | Callahan et al. | 206/308.3 X |

FOREIGN PATENT DOCUMENTS 8806794   9/1988   WIPO ............................ 206/308.1

*Primary Examiner*—Korie Chan
*Assistant Examiner*—Sandra Snapp
*Attorney, Agent, or Firm*—Alfred Lei

[57] ABSTRACT

A CD storage rack including a casing, and a plurality of individual sliding CD carriers slidably mounted in the casing at different elevations to carry a respective individual CD, wherein each individual sliding CD carrier has spring means fastened to the top cover of the individual CD case carried thereon so that the top cover of the respective individual CD case is automatically opened by the spring means when the respective individual sliding CD carrier is pulled out of the casing.

1 Claim, 4 Drawing Sheets

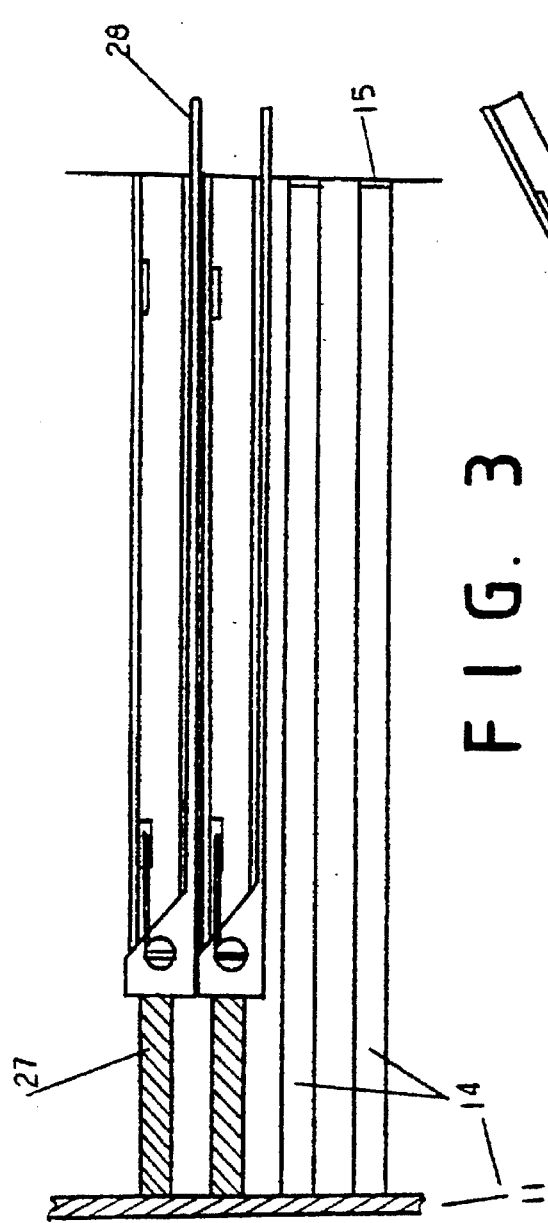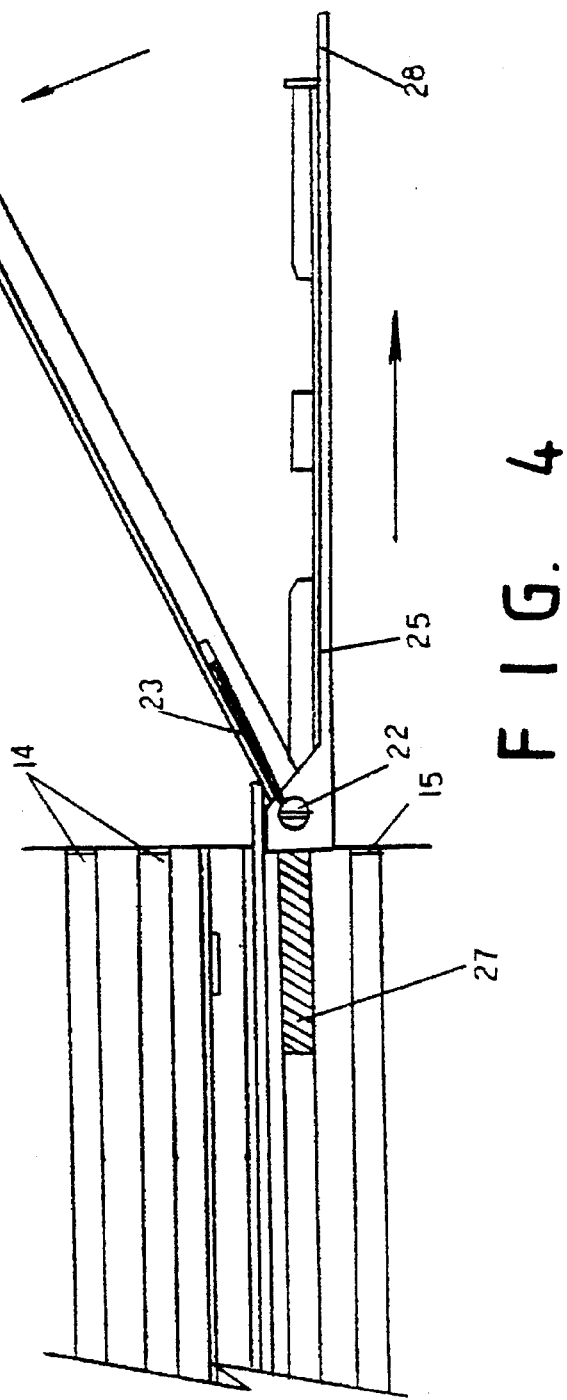

CD STORAGE RACK

BACKGROUND OF THE INVENTION

1. Field of the Invention

This invention relates to CD storage racks, and relates more particularly to such a CD storage rack which automatically opens the top cover of the individual CD case when the respective individual sliding CD carrier is pulled out of the CD storage rack.

2. Description of the Prior Art

A variety of CD storage means have been disclosed, and have appeared on the market. These CD storage means commonly designed for keeping individual CD cases. When one individual CD case is pulled out of a CD storage means, the top cover of the individual CD case must be opened by hand so that the compact disk can be taken out of the individual CD case for playing. When the compact disk is taken out of the individual CD case, the individual CD case may be lost in somewhere if it is not put back inside the CD storage means.

SUMMARY OF THE INVENTION

This invention relates to an improved CD storage rack.

It is one object of the present invention to provide a CD storage rack which automatically opens the top cover of the individual CD case when the respective individual sliding CD carrier is pulled out of the rack. It is another object of the present invention to provide a CD storage rack which is inexpensive to manufacture.

According to the preferred embodiment of the present invention, the CD storage rack comprises a casing, and a plurality of individual sliding CD carriers slidably mounted in the casing at different elevations to carry a respective CD, wherein each of the individual sliding CD carrier comprises a base plate, a flat hand-hold portion at a front end of the base plate, a transverse CD holder portion for loosely holding the close side of an individual CD case, two stub pins outwardly extending from two opposite ends of the transverse CD holder portion, two stub stop rods outwardly extending from two opposite lateral sides of the base plate adjacent to the transverse CD holder portion at a lower elevation than the stub pins, two spring elements respectively fastened to the stub pins, each spring element having a hooked front end for fastening to the top cover of the individual CD case being carried thereon, the hooked front end being fastened to one stub stop rod when the respective individual sliding CD carrier carries no CD, and two sliding bars bilaterally and backwardly extending from the transverse CD holder portion and respectively inserted into a respective transverse sliding groove on the casing.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

BRIEF DESCRIPTION OF THE DRAWINGS

FIG. 3 is a partial view in section of the CD storage rack of the preferred embodiment of the present invention, showing individual sliding CD carriers received on the inside of the casing;

FIG. 4 is another partial view in section of the CD storage rack of the preferred embodiment of the present invention, showing one sliding CD carrier pulled out of the casing and the respective compact disk lifted from the extended sliding CD carrier.

DETAILED DESCRIPTION OF THE PREFERRED EMBODIMENT

Figure 1:
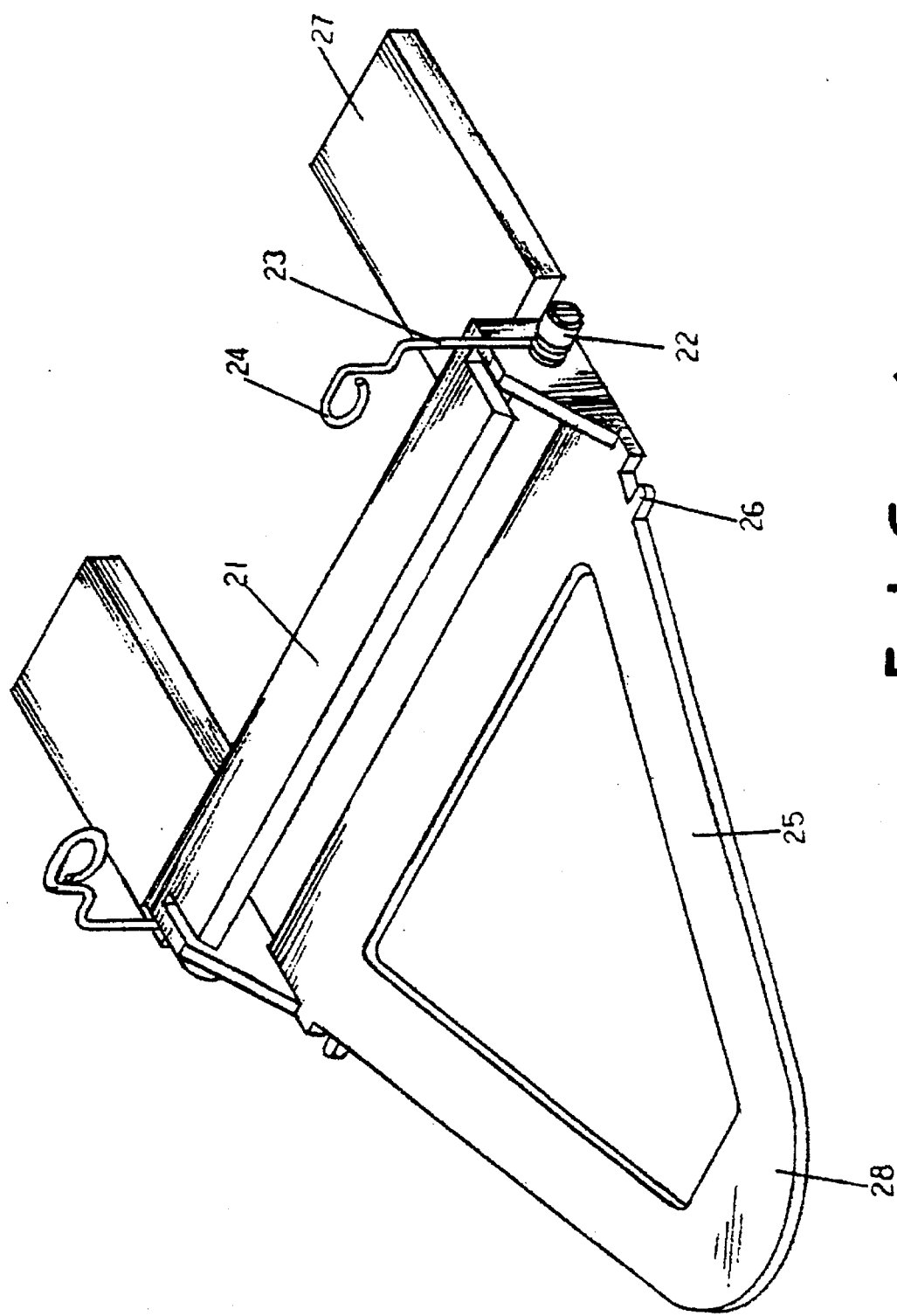
FIG. 1 is a perspective view of a sliding CD carrier according the present invention.

For purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
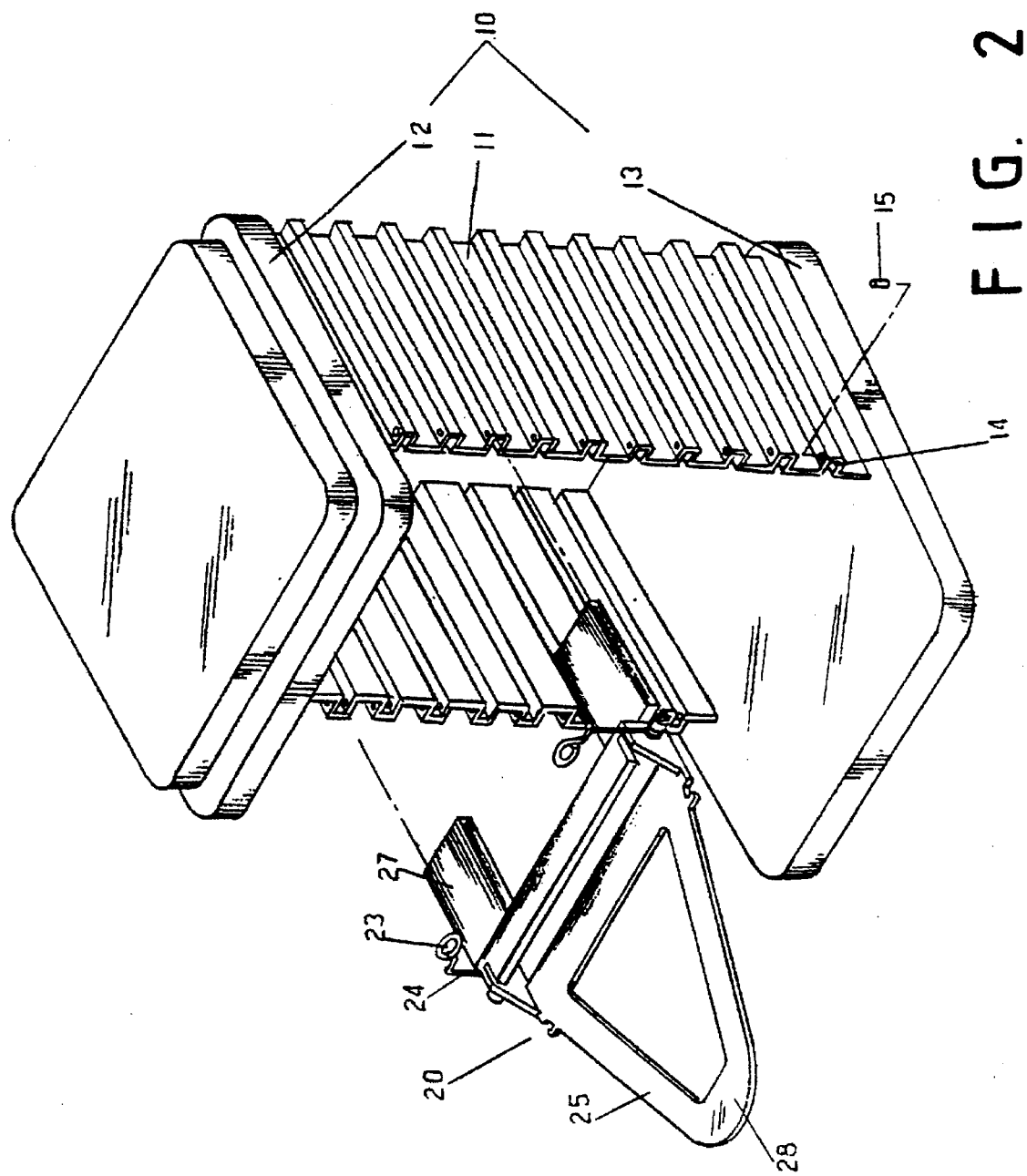
FIG. 2 is an exploded view of the CD storage rack of the preferred embodiment of the present invention.
Figure 5:
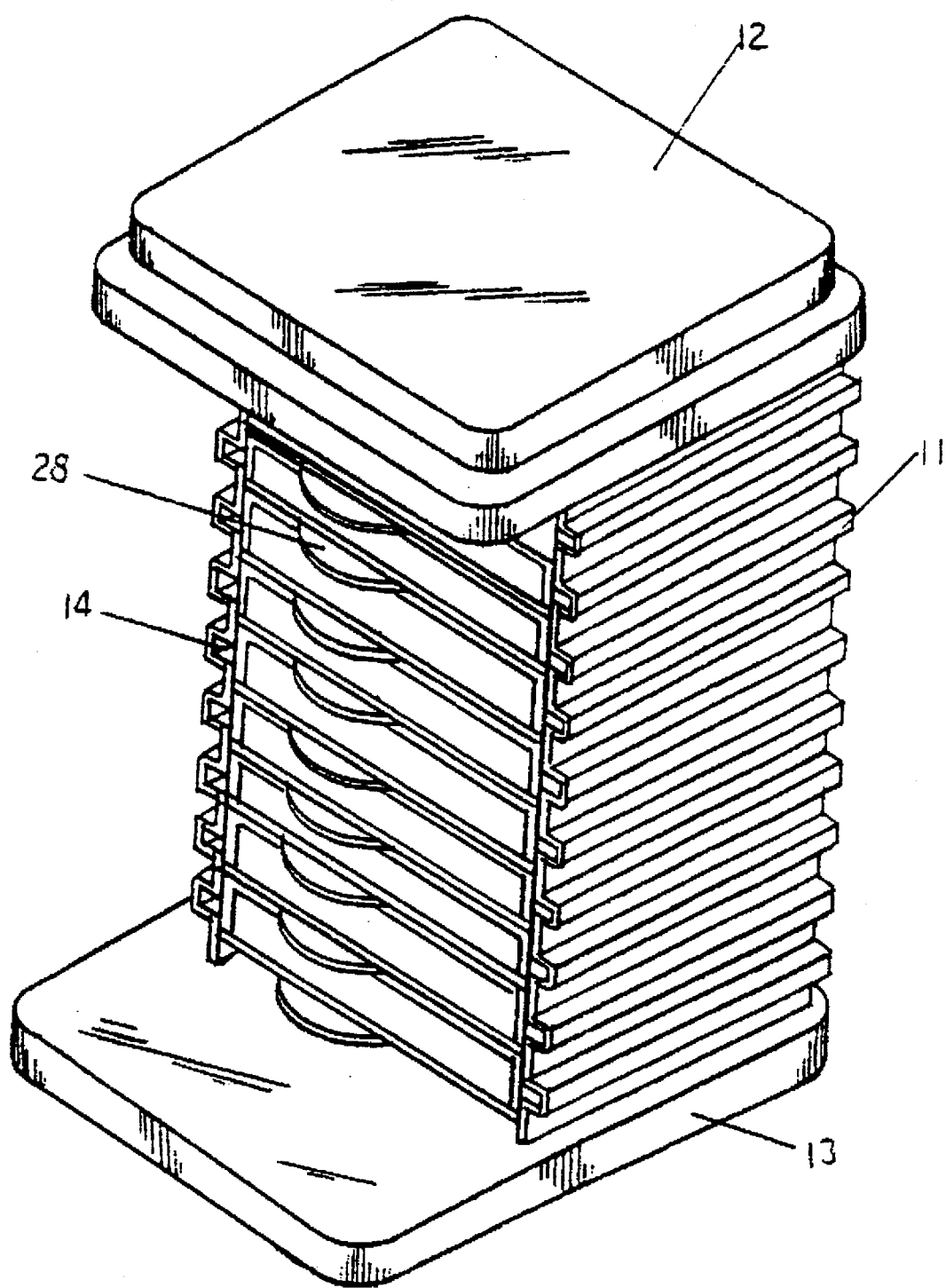
FIG. 5 is a perspective view of the CD storage rack of the preferred embodiment of the present invention.

Referring to FIGS. 2 and 5, a CD storage rack in accordance with the present invention is generally comprised of a casing 10, and a plurality of individual sliding CD carriers 20 slidably mounted in the casing 10 at different elevations to carry a respective CD (compact disk). The casing 10 comprises a flat base 13, two vertical side walls 11 raised from the flat base 13 and disposed in a parallel relation, and a top cover 12 covered on the vertical side walls 11 at the top. The vertical side walls 11 and the flat base plate 13 are integrally injection-molded from plastics. The top cover 12 is separately injection-molded from plastics, and then covered on the vertical side walls 11. The vertical side walls 11 are symmetrical, each having a plurality of transverse sliding grooves 14 at an inner side at different elevations. The individual sliding CD carriers 20 are slidably mounted in the transverse sliding grooves 14, and moved between the vertical side walls 11 of the casing 10. After the installation of the individual sliding CD carriers 20, a stop pin 15 is respectively fastened to each transverse sliding groove 14 at the front end to limit the forward stroke of the respective individual sliding CD carrier 20. Therefore, the individual sliding CD carriers 20 do not disconnect from the casing 10 when they are respectively pulled outwards to the extended position.

Referring to FIG. 1 and FIG. 2 again, the individual sliding CD carrier 20 comprises base plate 25, a flat hand-hold portion 28 at the front end of the base plate 25, a transverse CD holder portion 21 for loosely holding the close side of an individual CD case, two stub pins 22 outwardly extending from two opposite ends of the transverse CD holder portion 21, two stub stop rods 26 outwardly extending from two opposite lateral sides of the base plate 25 adjacent to the transverse CD holder portion 21 at a lower elevation than the stub pins 22, two spring elements 23 respectively fastened to the stub pins 22, each spring element 23 having a hooked front end 24 for fastening to the cover of the individual CD case being carried thereon, and two sliding bars 27 bilaterally and backwardly extending from the transverse CD holder portion 21 and respectively inserted into one transverse sliding groove 14 of each vertical side wall 11 of the casing 10. The spring elements 23 are constantly maintained in an upright position perpendicular to the top surface of the flat base plate 25. When the individual sliding CD carrier 20 carries no CD, the spring elements 23 are respectively turned downwards from the vertical position to the horizontal position, and then retained in place by fastening the respective hooked front ends 24 to the stub stop rods 26. When an individual CD case is carried on the individual sliding CD carrier 20, the hooked front ends 24 of the spring elements 23 are released from the stub stop rods 26 and fastened to the top cover of the individual CD case.

Referring to FIG. 3, when the individual CD carriers 20 are respectively moved backwards inside the casing 10, the hand-hold portion 28 of each individual CD carrier 20 protrudes out of the front side of the casing 10 convenient for pulling by hand.

Referring to FIG. 4, when one individual CD carrier 20 is pulled out of the casing 10, the spring elements 23 automatically lift the top cover of the respective individual CD case, and the CD can be conveniently taken out of the individual CD case.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A CD storage rack comprising a casing, and a plurality of individual sliding CD carriers slidably mounted in said casing at different elevations to carry a respective CD, wherein each of said individual sliding CD carrier comprises a base plate, a flat hand-hold portion at a front end of said base plate, a transverse CD holder portion for loosely holding the close side of an individual CD case, two stub pins outwardly extending from two opposite ends of said transverse CD holder portion, two stub stop rods outwardly extending from two opposite lateral sides of said base plate adjacent to said transverse CD holder portion at a lower elevation than said stub pins, two spring elements respectively fastened to said stub pins, each spring element having a hooked front end for fastening to the top cover of the individual CD case being carried thereon, said hooked front end being fastened to one stub stop rod when the respective individual sliding CD carrier carries no CD, and two sliding bars bilaterally and backwardly extending from said transverse CD holder portion and respectively inserted into a respective transverse sliding groove on said casing.

* * * * *